United States Patent [19]

Chen

[11] Patent Number: 5,236,248
[45] Date of Patent: Aug. 17, 1993

[54] DRIVING STRUCTURE FOR CHILDREN'S TRICYCLE

[75] Inventor: Ting-Hsing Chen, Tainan, Taiwan

[73] Assignee: Far Great Plastics Industrial Co., Ltd., Tainan, Taiwan

[21] Appl. No.: 913,355

[22] Filed: Jul. 15, 1992

[51] Int. Cl.$^5$ .............................................. B60B 37/00
[52] U.S. Cl. ..................................... 301/2.5; 280/240; 280/259; 280/282; 74/594.1; 74/594.4; 301/110.5
[58] Field of Search ............... 280/240, 259, 282; 301/2.5, 110.5, ; 74/594.1, 594.4

[56] References Cited

U.S. PATENT DOCUMENTS 4,049,319 9/1977 Hartung ........................ 301/2.5 X
4,405,179 9/1983 Boudreau et al. ................. 301/2.5

FOREIGN PATENT DOCUMENTS 72837 6/1928 Belgium ............................ 74/594.1
85856 5/1895 Fed. Rep. of Germany ..... 74/594.1
245629 5/1987 German Democratic Rep. ................................... 74/594.1

Primary Examiner—Russell D. Stormer
Assistant Examiner—Gary C. Hoge
Attorney, Agent, or Firm—Morton J. Rosenberg; David I. Klein

[57] ABSTRACT

A driving structure for children's tricycle includes a cylindrical shell adapted to receive a crank case therein. The crank case is composed of an upper and a lower half cases, each is identical to the other and has a trough and two strips adapted to rest a flat plate of the crank thereon, and has a flat plate at one having a crank receiving cup extending at the opposite end.

1 Claim, 4 Drawing Sheets

DRIVING STRUCTURE FOR CHILDREN'S TRICYCLE

FIELD OF THE INVENTION

This driving structure of prior art, as shown in FIG. 4, is generally composed of two cranks A having connected with a pedal D at one end of each. One crank A has a square bore and the other crank a has a square protuberance that is sized to be insert into the bore of the other crank A. Two discs A1 are securely attached to the crank A each having a number of apertures A2 adapted to be connected to a shell C by means of screws B. Such structure requires more labors to install.

In view of this, the inventor has invented the present invention which requires less installation labor and is more secure.

SUMMARY OF THE INVENTION

It is primary object of the present invention to provide a driving structure for children's tricycle which takes less man power to assemble.

It is another object of the present invention to provide a driving structure for children's tricycle which is more secure.

DETAILED DESCRIPTION OF THE PREFERRED EMBODIMENT

Figure 1:
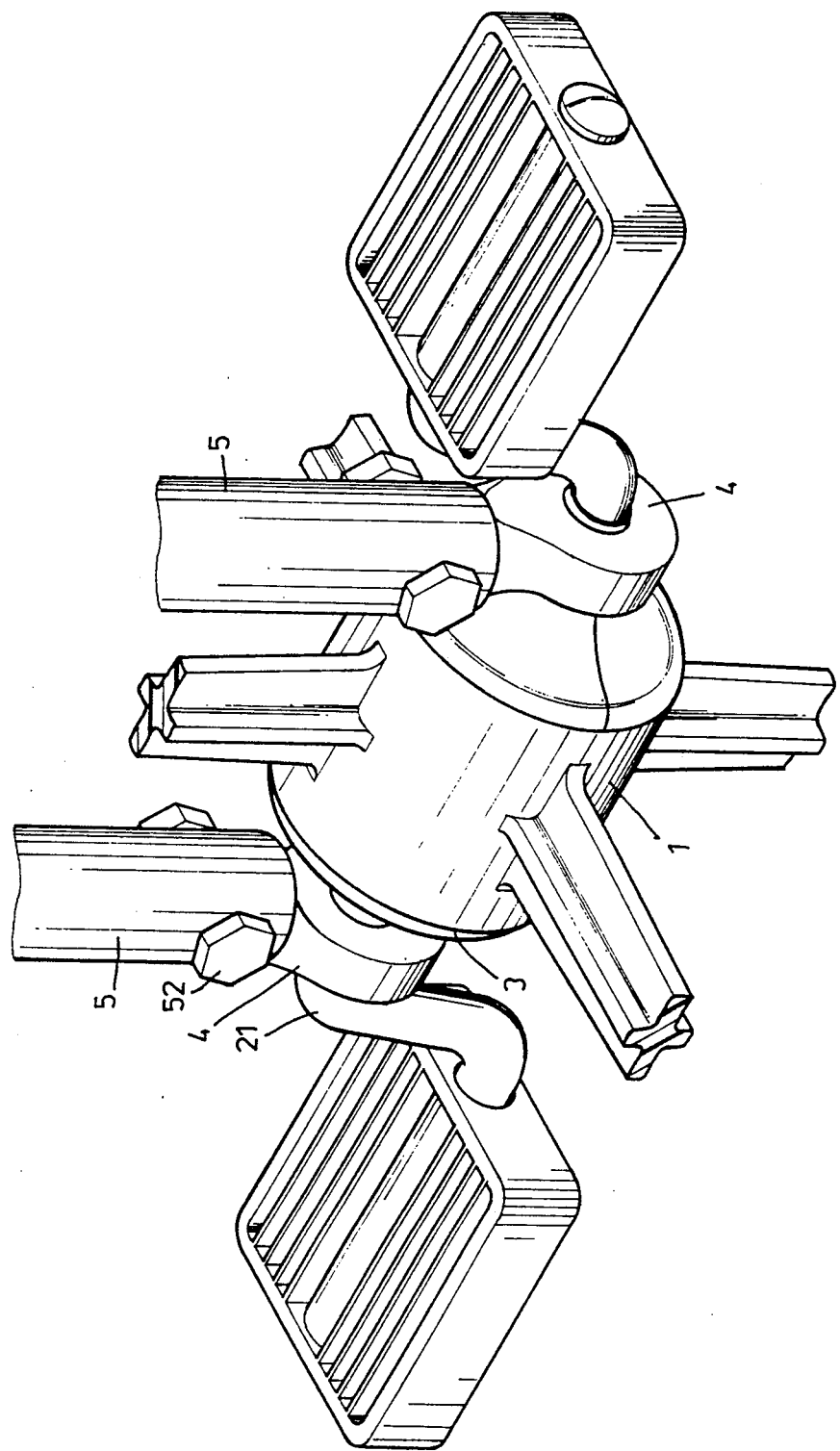
FIG. 1 is a perspective view of the present invention.
Figure 2:
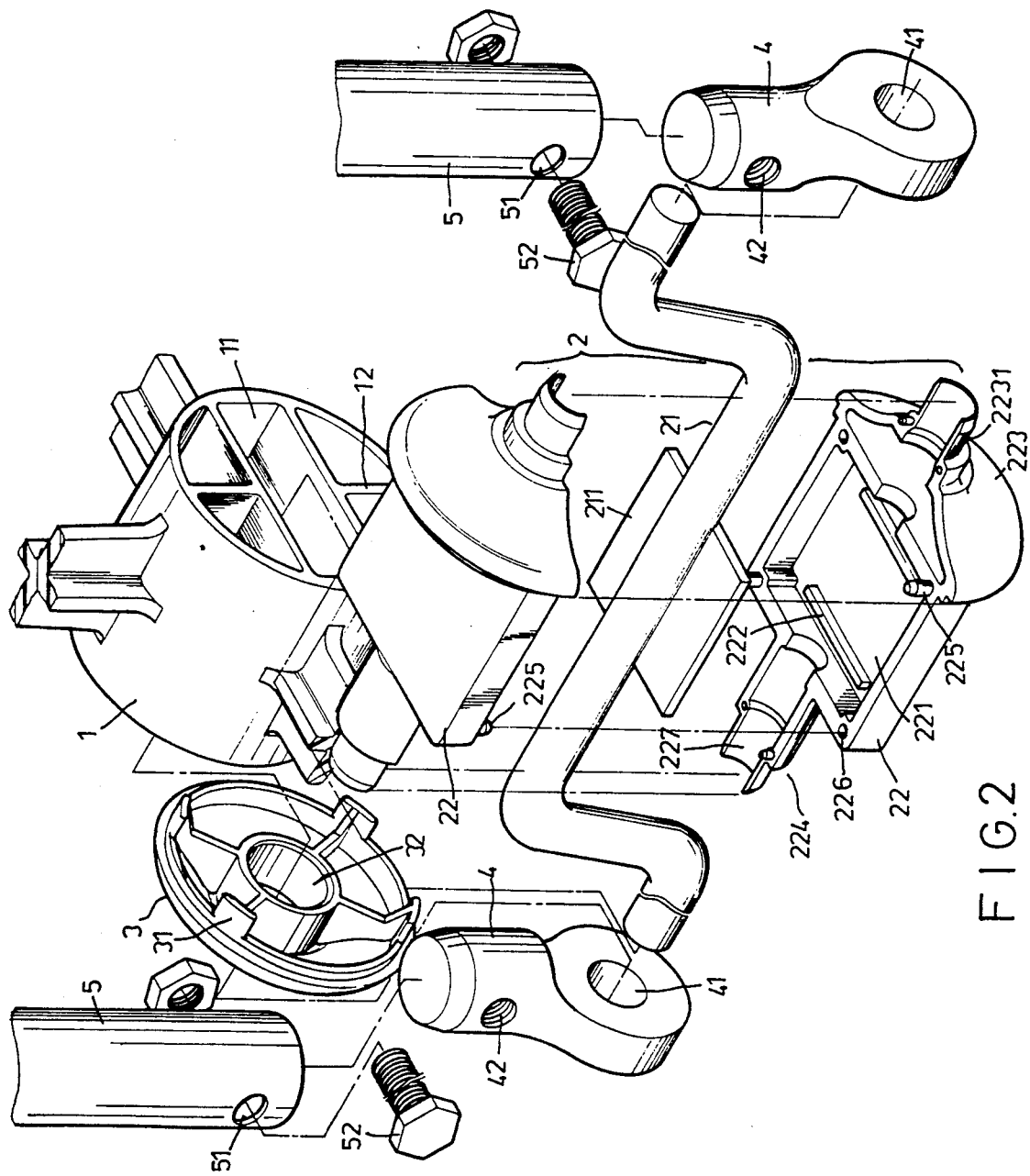
FIG. 2 is an exploded view of the present invention.
Figure 3:
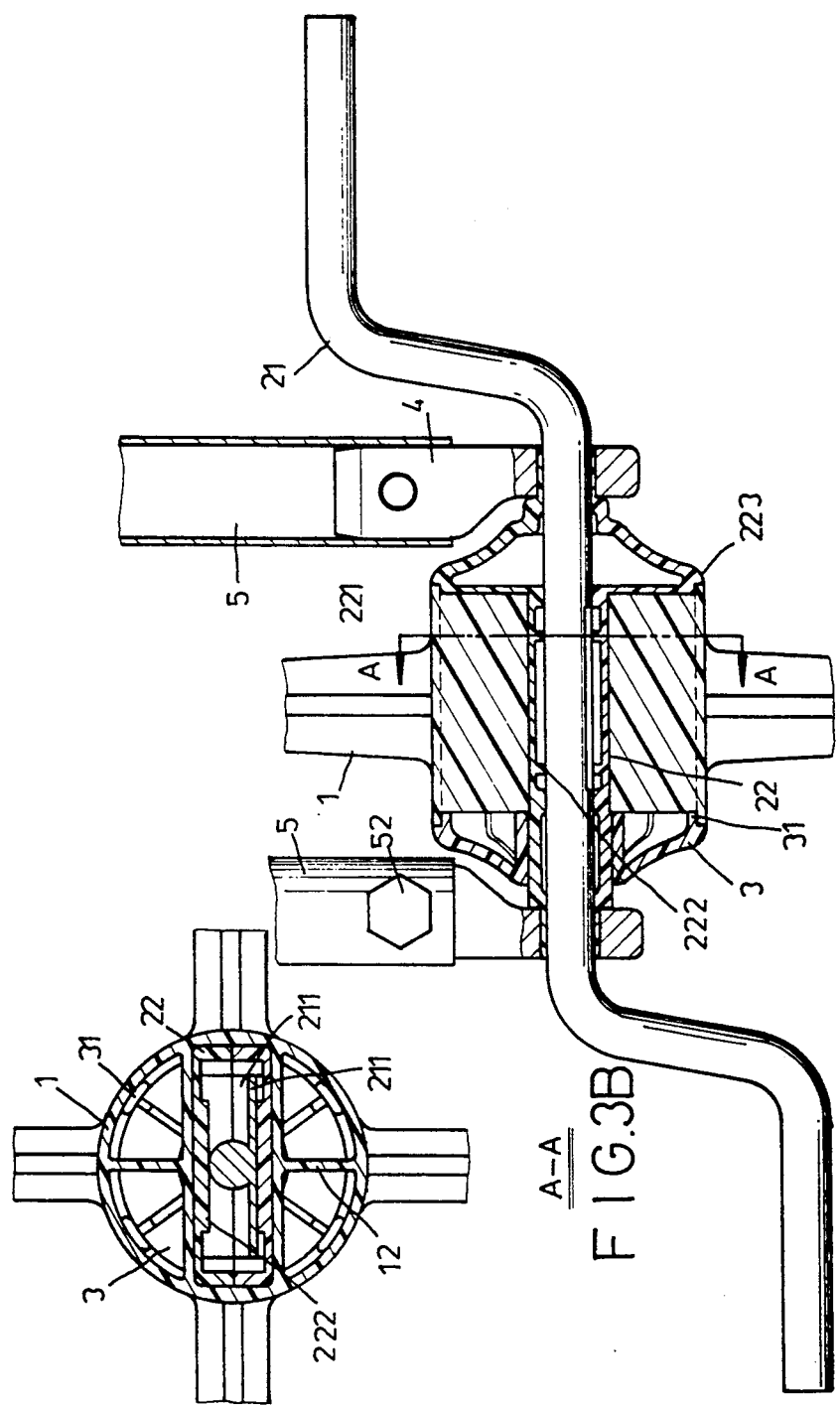
FIG. 3A is a side elevational view of FIG. 1, partially sectioned.
FIG. 3B is a front view of FIG. 1, partially sectioned.
Figure 4:
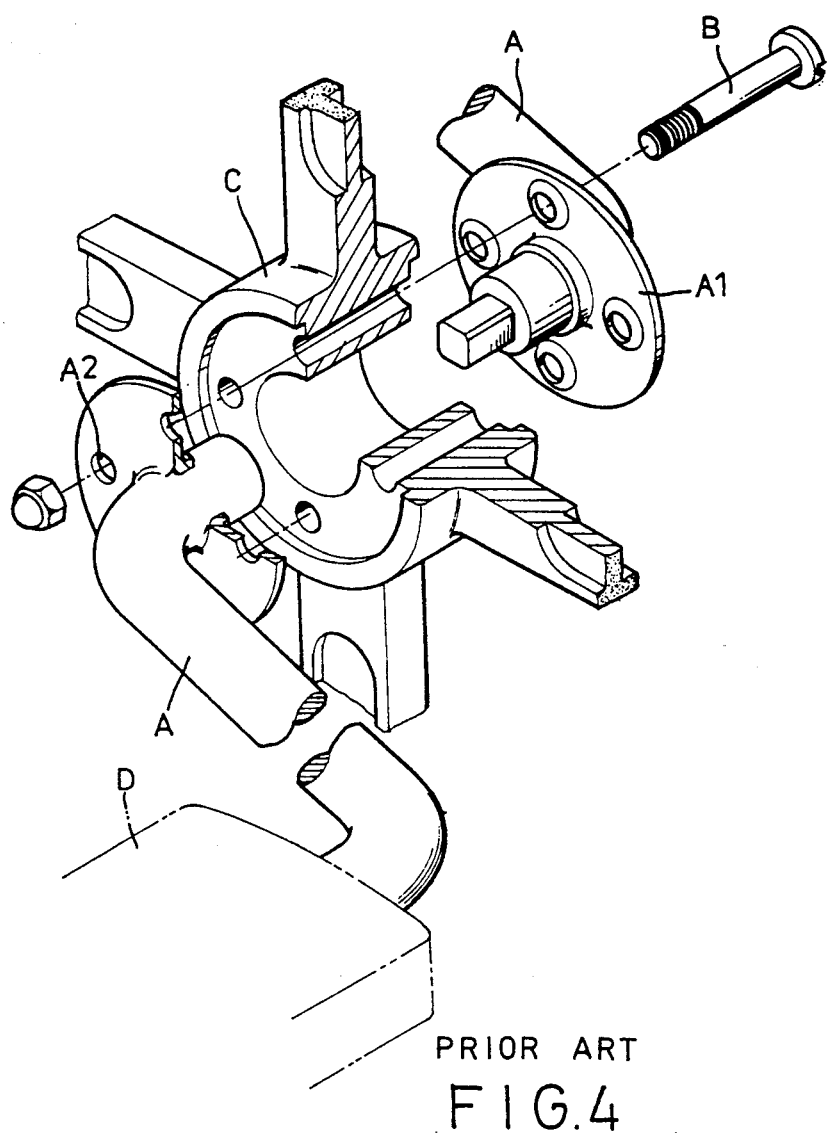
FIG. 4 is an exploded view of prior art.

Reference is now made to the drawings wherein each drawing is made for illustrating purpose and is not made limiting, FIGS. 1 and 2 show the present invention composed essentially of a cylindrical shell 1, a crank means 2, including a crank 21 and a crank case 22 including an upper and a lower case, a cover 3, two adapters 4 at respective ends of the crank 21 adapted to be connected with front wheel forks 5, respectively.

The shell 1 is cylindrical in shape having a receiving trough 11 along the longitudinal axis adapted to receive the crank case 22 therein. A pair of reinforcing ribs 12 reinforce the structure of the shell 1.

The crank 21 of crank means 2 is made of a solid bar and is bent at respective ends and connected thereat with two adapters 4, respectively, and includes a flat plate 211 secured to the center portion thereof. The crank case 22 includes an upper and a lower case each of which is identical to each other and each has a trough 221 and two strips 222 at two sides adapted to rest the plate 211 thereon, a half circular plate 223 at one end having a crank receiving cup 2231, a crank receiving cup 224 at the other end and a passage 227 therein for crank 21 to extend therefrom, a number of integral pins 225 and apertures 226 at each corners that are aligned with the apertures and pins of the other case 22.

The cover 3 is a circular plate having a plurality of protuberances 31 at inner peripheral adapted to assist the connection of the cover 3 with the shell 1, an aperture 32 at center portion adapted for the insertion of the axle receiving cup 224.

Two adapters 4 having holes 41 adapted to be secured to the respective ends of the crank 21 adapted to connected with fork 5 by means of bolts 52 inserted through aperture 51, internal threaded aperture 42 and secured by a nut at the other end.

To assemble, first place the crank 21 in either of the crank case 22 and cap with the other crank case 22, then insert the crank 21 into the trough 11 with the crank case 22 seating therein. Cover the end opposite the half circular plate 223 with the cap 3, thus the installation of the present invention is completed.

When rotating the crank 21, the flat 211 links the crank case 22 and the shell 1 to rotate simultaneously, thus links the tricycle to move.

I claim:

1. A driving structure for children's tricycle comprising:
    a cylindrical shell having a trough along the longitudinal axis thereof adapted to receive a crank case, said shell having reinforce ribs therein;
    a crank means including a crank having a center portion and being bent at respective ends to receive two pedals, said crank having a flat plate secured to the center portion; said crank means having an upper and a lower half crank case each being identical and including two ends, a trough and two strips therein adapted to rest said flat plate thereon, a half circular plate at one end thereof having a first crank receiving cup, a second crank receiving cup at the other end opposite the half circular plate, said first and second crank receiving cups each having a passage adapted to receive said crank therein, said upper and lower half crank cases each having a plurality of pins and apertures for connecting the two half cases together;
    and said driving structure further including a cover having a plurality of protuberances adapted to assist connection of said cover with said cylindrical shell and said cover having an aperture adapted to receive said crank to extend therethrough.

* * * * *